United States Patent
Mahankali et al.

(10) Patent No.: US 11,374,521 B2
(45) Date of Patent: Jun. 28, 2022

(54) MOTOR RESISTANCE AND INDUCTANCE VALUES FROM INITIAL POSITION DETECTION TIMING PARAMETERS

(71) Applicant: Texas Instruments Incorporated, Dallas, TX (US)

(72) Inventors: Venkata Pavan Mahankali, Bengaluru (IN); Ganapathi Hegde, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/900,316

(22) Filed: Jun. 12, 2020

(65) Prior Publication Data
US 2021/0391813 A1 Dec. 16, 2021

(51) Int. Cl.
*H02P 21/00* (2016.01)
*H02P 21/18* (2016.01)
*H02P 21/22* (2016.01)

(52) U.S. Cl.
CPC ............. *H02P 21/18* (2016.02); *H02P 21/22* (2016.02); *H02P 2203/03* (2013.01)

(58) Field of Classification Search
CPC ...... H02P 21/18; H02P 21/22; H02P 2203/03; H02P 6/188; H02P 6/22; H02P 2204/07
See application file for complete search history.

(56) References Cited

FOREIGN PATENT DOCUMENTS

| CN | 101800509 A | * | 8/2010 |
| CN | 107171608 A | * | 9/2017 |
| JP | H0289486 U | * | 7/1990 |

* cited by examiner

*Primary Examiner* — Karen Masih
(74) *Attorney, Agent, or Firm* — John R. Pessetto; Charles A. Brill; Frank D. Cimino

(57) ABSTRACT

A system includes: a motor having a stator and a rotor; and a pulse generation circuit coupled to the stator. The system also includes a motor controller coupled to the pulse generation circuit. The motor controller is configured to: determine inductance and resistance values of the motor based on timing parameters obtained during an initial position detection (IPD) interval; determine a rotor position based on the determined inductance and resistance values; and generate control signals for the pulse generation circuit based on the determined rotor position.

18 Claims, 9 Drawing Sheets

MOTOR RESISTANCE AND INDUCTANCE VALUES FROM INITIAL POSITION DETECTION TIMING PARAMETERS

BACKGROUND

The proliferation of electronic devices and integrated circuit (IC) technology has resulted in the commercialization of IC products. As new electronic devices are developed and IC technology advances, new IC products are commercialized. One example IC product that is needed in electronic devices is a direct current (DC) motor controller. In one example motor controller, a sensorless field oriented control (FOC) algorithm is used to determine rotor position and to generate motor control signals for a 3-phase DC motor (e.g., a brushless DC electric motor or "BLDG" motor) having a stator (a stationary portion of the motor) and a rotor (a rotating portion of the motor). To determine the rotor position, the sensorless FOC algorithm uses measured phase currents rather than contact sensors or Hall-effect sensors, which tend to wear out over time and/or increase motor design complexity. In addition, the sensorless FOC algorithm uses an inductance (L) value of the motor coil and a resistance (R) of the motor coil to determine rotor position. In a conventional sensorless FOC algorithm scenario, the R and L parameters are measured using instruments and the stored by a motor controller as configuration values, which represents an undesirable delay and cost. Efforts to improve motor controller IC products are ongoing.

SUMMARY

In accordance with at least one example of the disclosure, a system comprises a motor having a stator and a rotor. The system also comprises a pulse generation circuit coupled to the stator. The system also comprises a motor controller coupled to the pulse generation circuit. The motor controller is configured to: determine inductance and resistance values of the motor based on timing parameters obtained during an initial position detection (IPD) interval; determine a rotor position based on the determined inductance and resistance values; and generate control signals for the pulse generation circuit based on the determined rotor position.

In accordance with at least one example of the disclosure, a motor controller device comprises a processor and a sense circuit coupled to the processor. The sense circuit comprises a first phase current sense circuit, a second phase current sense circuit, and a timing circuit coupled to the first and second phase current sense circuits. The timing circuit is configured to measure current rise times and fall times due to different phase currents sensed by the first and second phase current sense circuits during an IPD interval. The processor is configured to determine inductance and resistance values of the motor based on the measured current rise times and fall times, and wherein the processor is configured to provide control signals for the motor based on the determined inductance and resistance values.

In accordance with at least one example of the disclosure, a motor control method comprises injecting different phase current pulses into a motor during an IPD interval. The motor control method also comprises measuring a current rise time and a current fall time for each of the different phase current pulses. The motor control method also comprises estimating inductance and resistance values of the motor based on the measured current rise times and current fall times. The motor control method also comprises calculating a rotor position related to the motor based on the estimated inductance and resistance values. The motor control method also comprises providing control signals to a pulse-width modulated (PWM) signal generator based on the calculated rotor position.

BRIEF DESCRIPTION OF THE DRAWINGS

For a detailed description of various examples, reference will now be made to the accompanying drawings in which.

DETAILED DESCRIPTION

Disclosed herein is a sense circuit included with an electronic circuit or motor controller, where the sense circuit includes timing logic to measure timing parameters of phase current pulses injected during an initial position detect (IPD) interval. The timing parameters obtained by the sense circuit are used to estimate resistance (R) and inductance (L) values of a motor. In some example embodiments, the estimated R and L values along with phase current measurements obtained during the IPD interval are used to determine a rotor position. The determined rotor position is then used to generate control signals (e.g., the components of the stator vector voltage in the ($\alpha$, $\beta$) stationary orthogonal reference frame) input to a pulse-width modulated (PWM) signal generator. The PWM signals output from the PWM signal generator are used to generate gate drive signals to control switches of an inverter (e.g., a 3-phase inverter) to provide current to a motor.

In some example embodiments, the timing logic of the sense circuit includes a comparator with a lower limit and an upper limit. The output of the comparator is used to track a current rise time between the lower limit to the upper limit. The output of the comparator is also used to track a current fall time between the upper limit and the lower limit. In some example embodiments, clock counts and storage units (e.g., registers) are used to store current rise time value and current fall time values based on the comparator output.

Also, in the proposed sense circuit, the timing logic accounts for comparator delay in the current rise time value and the current fall time value. In some example embodiments, the comparator delay is accounted for by using both the lower limit and the upper limit with the comparator, resulting in more accurate current rise time and the current fall time values.

In different examples, the sense circuit is part of an integrated circuit (IC), multi-die module (MDM), multi-chip module, system on a chip (SoC), or other commercial circuit or device. In some example embodiments, the sense circuit is part of the same IC as the motor controller. In other examples, the sense circuit and the motor controller are on different ICs. In either case, the motor controller uses the sense circuit measurements to estimate R and L as described herein, and to perform other motor control operations. To provide a better understanding, various sense circuit options and related motor control systems or scenarios are described using the figures as follows.

Figure 1:
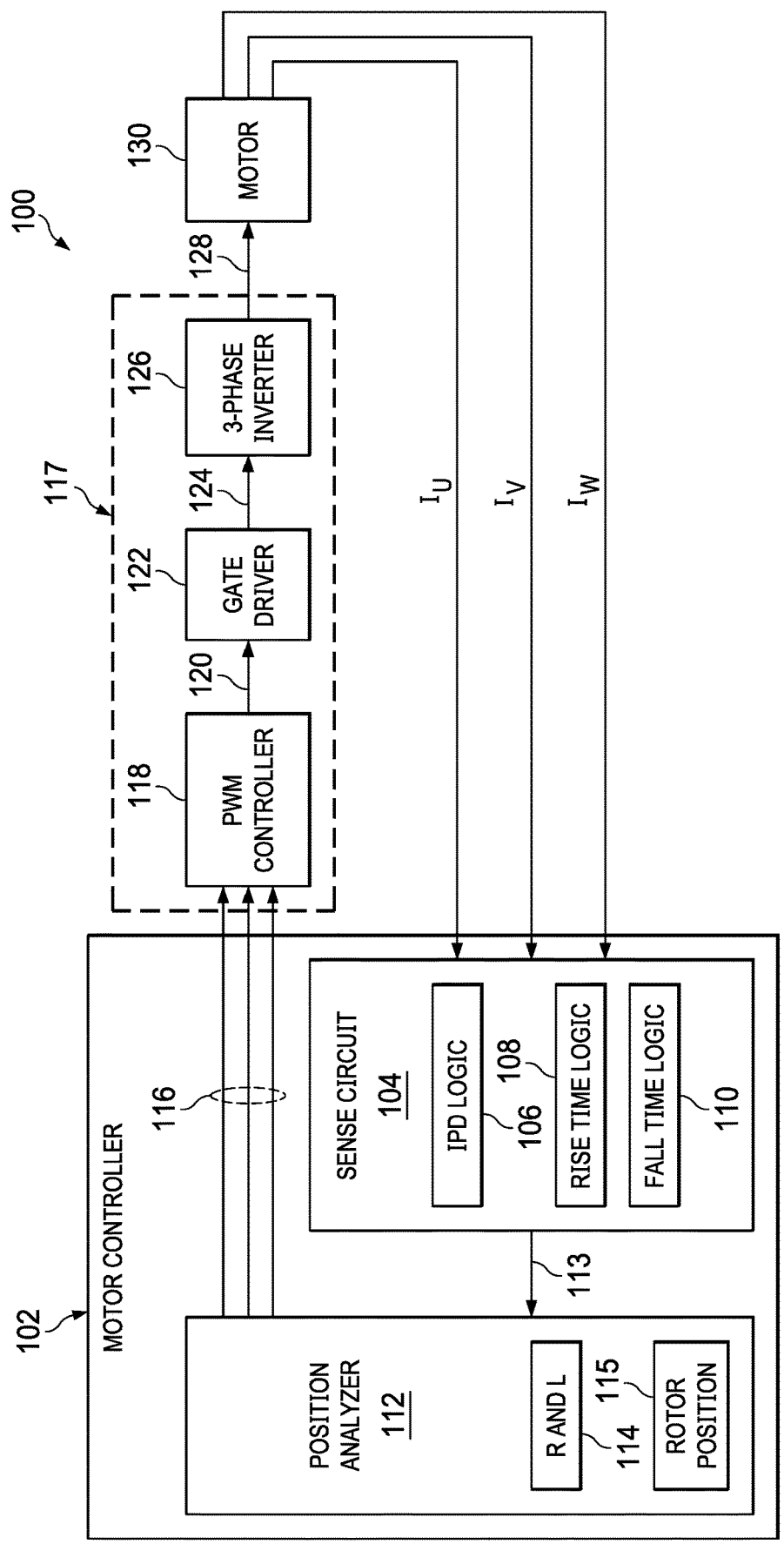
FIG. 1 is a block diagram showing a system in accordance with an example embodiments.

FIG. 1 is a block diagram showing a system 100 in accordance with an example embodiment. As shown, the system 100 comprises a motor controller 102 coupled to a pulse generation circuit 117, where the pulse generation circuit 117 is coupled to a motor 130 and provides phase voltages and currents 128 to the motor 130. In the example of FIG. 1, the pulse generation circuit 117 includes a PWM controller 118 coupled to the motor controller 102 and configured to generate PWM signals 120 based on control signals 116 from a position analyzer 112 of the motor controller 102. The PWM signals 122 are received by a gate driver 122, which provides drive signals 124 to switches (not shown) of a 3-phase inverter 126, resulting in phase voltages and currents 128 for the motor 130.

As shown, the motor 130 is also coupled to the motor controller 102 as part of a feedback or control loop that includes components of the motor controller 102. More specifically, the motor controller 102 includes a sense circuit 104 configured to obtain first phase current sense measurements of a first phase current ($I_U$), a second phase current sense measurements of a second phase current ($I_V$), and/or third phase current sense measurements of a third phase current ($I_W$). In the example of FIG. 1, the sense circuit 104 is represented as including IPD logic 106 to obtain phase current sense values during an IPD interval. In some example embodiments, the IPD logic 106 includes current sense circuits and/or other components to measure the phase current pulses (e.g., $U\overline{V}$, $U\overline{W}$, $V\overline{W}$, $V\overline{U}$, $W\overline{U}$, and $W\overline{V}$) injected during an IPD interval. The sense circuit also includes rise time logic 108 and fall time logic 110 (sometimes referred to as timing logic herein) configured to measure phase current rise time and fall time values during an IPD interval.

In some example embodiments, the rise time logic 108 is configured to obtain rise time parameters of one or more phase current pulses (e.g., UV, UW, VW, VU, WU, and WV) injected into the motor 130 during an IPD interval. In some example embodiments, the rise time logic 108 includes a comparator (e.g., the comparator 431 in FIG. 4C) with a lower limit and an upper limit. The rise time logic 108 also includes clock circuitry and storage units (e.g., registers) configured to store a clock count based on the output of the comparator. The fall time logic 110 is configured to obtain fall time parameters of one or more phase current pulses (e.g., UV, UW, VW, VU, WU, and WV) injected into the motor 130 during an IPD interval. In some example embodiments, the fall time logic 110 includes the comparator with a lower limit and an upper limit. The fall time logic 110 also includes clock circuitry and storage (e.g., registers) configured to store a clock count based on the output of the comparator.

In the example of FIG. 1, values 113 obtained by the sense circuit 104 are provided to a position analyzer 112. In some example embodiments, the values 113 include phase current measurements, and timing parameters such as pulse rise time values, and pulse fall time values for one or more phase current pulses (e.g., $U\overline{V}$, $U\overline{W}$, $V\overline{W}$, $V\overline{U}$, $W\overline{U}$, and $W\overline{V}$) injected into the motor 130 during an IPD interval. As represented in FIG. 1, the position analyzer 112 includes R and L instructions 114 configured to estimate R and L values for the motor 130 based on at least some of the timing parameters included with the values 113. The position analyzer 112 uses the estimated R and L values as well as phase current measurements to determine a rotor position 115, from which control signals 116 (e.g., the components of the stator vector voltage in the (α, β) stationary orthogonal reference frame) are determined. In some example embodiments, the operations of the position analyzer 112 include sensorless field oriented control (FOC) algorithm operations to determine In the example of FIG. 1, the control signals 116 are provided from the position analyzer 112 to the pulse generation circuit 117. In some example embodiments, position analyzer 112 uses a sensorless FOC algorithm to determine the rotor position 115 based at least in part on the R and L values estimated based on the timing parameters included with the values 113 obtained from the sense circuit 104. By estimating R and L as described herein, use of external instruments to measure R and L can be avoided.

Figure 2A:
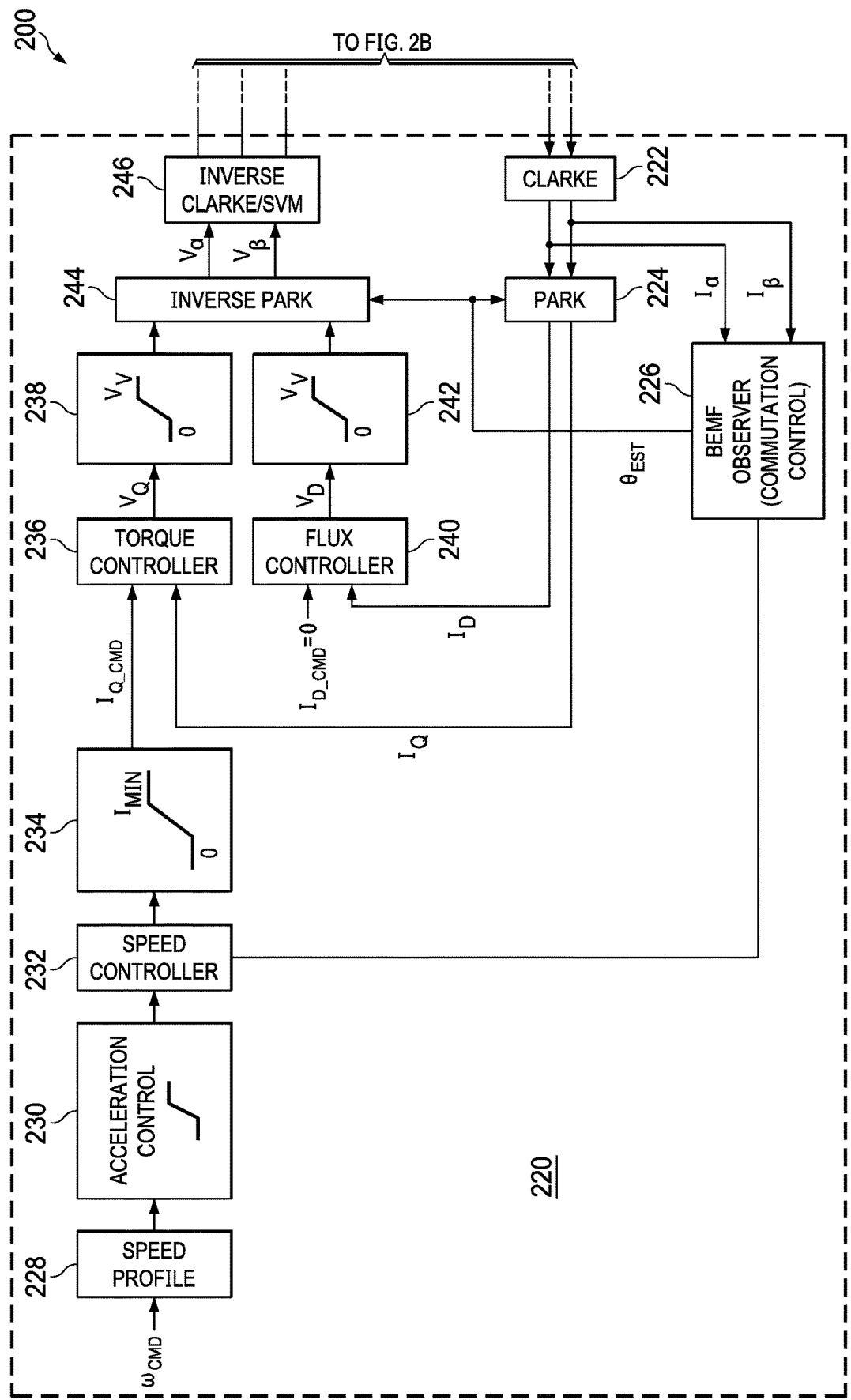
FIGS. 2A and 2B is a block diagram showing a system with sensorless field oriented control (FOC) motor control in accordance with an example embodiments.
Figure 2B:
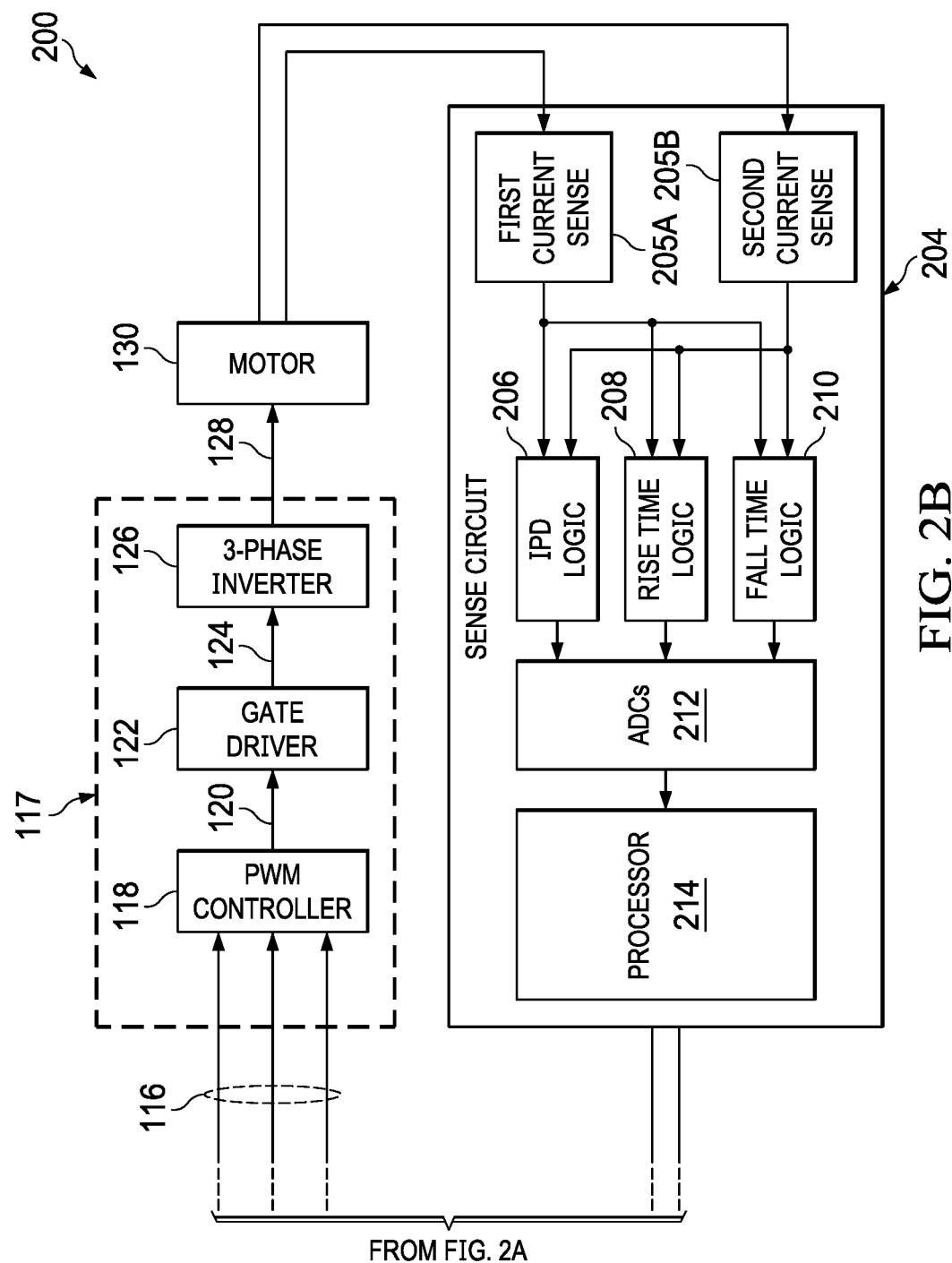

FIGS. 2A and 2B is a block diagram showing a system 200 with sensorless FOC motor control in accordance with an example embodiment. As shown, the system 200 comprises a processor 220 configured to perform various sensorless FOC algorithm operations represented by blocks 222, 224, 226, 228, 230, 232, 234, 236, 238, 240, 242, 244, and 246. More specifically, block 222 corresponds to Clarke operations based on obtained first and second phase current sense measurements from a current sense circuit 204 (an example of the current sense circuit 104 in FIG. 1). Block 224 corresponds to Park operations based on the outputs ($I_\alpha$ and $I_\beta$) from block 222 and a theta estimate ($\theta_{EST}$) from block 226. Block 226 corresponds to back electromagnetic force (BEMF) observer operations based on the outputs from block 222. Block 228 corresponds to speed profile operations involving $\omega_{CMD}$, where $\omega_{CMD}$ is commanded motor speed. Block 230 corresponds to acceleration control operations based on the output of block 228. Block 232 corresponds to speed controller operations based on the outputs of blocks 226 and 230. Block 234 corresponds to current control operations based on the output of block 232, where the output of block 234 is a command current ($I_{Q\_CMD}$). Block 236 corresponds to torque controller operations based on $I_{Q\_CMD}$ from block 234 and $I_Q$ from block 224. Block 238 corresponds to voltage ramp operations based on the output ($V_Q$) of block 236. Block 240 corresponds to flux controller operations based on a first current ($I_{D\_CMD}$) from block 232 and a second current ($I_D$) from block 224. Block 242 corresponds to voltage ramp operations based on the output ($V_D$) of block 240. Block 244 corresponds to inverse Park operations based on the outputs from block 238 and 242. Block 246 corresponds to inverse Clarke and space vector modulation (SVM) operations based on the outputs ($V_\alpha$ and $V_\beta$) from block 244.

In some example embodiments, the outputs of block 246 corresponds to the control signals 116 (e.g., the components of the stator vector voltage in the (α, β) stationary orthogonal reference frame) for a pulse generation circuit 117 coupled to a motor. Again, the pulse generation circuit 117 includes a PWM controller 118, a gate driver 122, and a 3-phase inverter 126. As part of the control loop for the system 200, timing parameters related to phase current pulses injected into the motor 130 during an IPD interval are obtained using the sense circuit 204. In the example of FIG. 2, the sense circuit 204 is represented as having IPD logic 206 (an example of the IPD logic 106 in FIG. 1), rise time logic 208 (an example of the rise time logic 108 in FIG. 1), fall time logic 210 (an example of the fall time logic 110 in FIG. 1), analog-to-digital converters (ADCs) 212, and a processor 214. In some example embodiments, the IPD logic 206 includes current sense circuits and/or other components to measure phase current pulses (e.g., $U\overline{V}$, $U\overline{W}$, $V\overline{W}$, $V\overline{U}$, $W\overline{U}$, and $W\overline{V}$) injected during an IPD interval. The rise time logic 208 is configured to obtain rise time parameters of one or more phase current pulses injected into the motor 130 during an IPD interval. In some example embodiments, the rise time logic 208 includes a comparator (e.g., the comparator 431 in FIG. 4C) with a lower limit and an upper limit. The rise time logic 208 also includes clock circuitry and storage (e.g., registers) configured to store a clock count based on the output of the comparator. The fall time logic 210 is configured to obtain fall time parameters of one or more phase current pulses injected into the motor 130 during an IPD interval. In some example embodiments, the fall time logic 210 includes the comparator with a lower limit and an upper limit. The fall time logic 210 also includes clock circuitry and storage (e.g., registers) configured to store a clock count based on the output of the comparator.

In some example embodiments, the ADCs 212 are used to convert current sense measurements obtained by the IPD logic 206 to discrete digital values. As another option, the outputs of the ADCs 212 are compared with a lower limit and an upper limit (a digital comparison is performed instead of an analog comparison to determine rise time values and fall time values). In such embodiments, the rise time logic 208 and fall time logic 210 are configured to measure and store a clock count based on the output of a digital comparator.

In some example embodiments, the processor 214 is configured to estimate the R and L values for the motor 130 based on the current measurements, rise time values, and fall time values. In such embodiments, the estimated R and L values are provided to the processor 220 for use in determining a rotor position (e.g., the BEMF observer 226 may use the R and L values as part of a sensorless FOC algorithm). In some example embodiments, the processor 214 is separate from the processor 220. In other examples, the processor 214 and the processor 220 correspond to one processor. By estimating R and L as described herein, use of external instruments to measure R and L can be avoided.

Figure 3A:
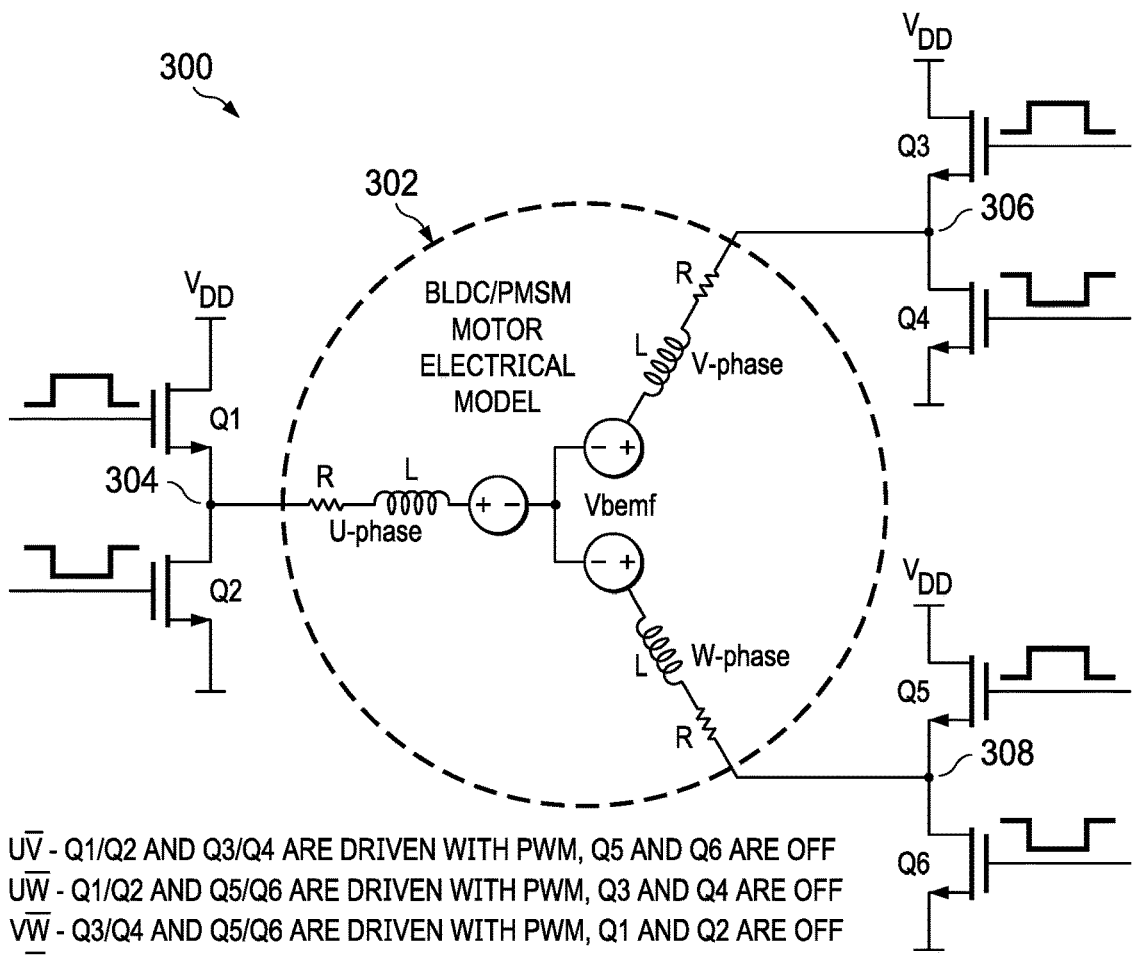
FIG. 3A is a diagram representing components of an inverter circuit and of a motor in accordance with an example embodiments.

FIG. 3A is a diagram representing components of an inverter circuit (e.g., the 3-phase inverter 126 in FIGS. 1 and 2 and of a motor 302 (an example of the motor 130 in FIGS. 1 and 2) in accordance with an example embodiment. The inverter circuit of FIG. 3A corresponds to transistors Q1-Q6 in the arrangement shown. More specifically, the current terminals of Q1 and Q2 are coupled in series between a supply voltage (VDD) node and a ground node. The node 304 between Q1 and Q2 is coupled to a U-phase of the motor 302, where the U-phase includes a resistance (R) and inductance (L) corresponding to stator components of the motor. Also, the current terminals of Q3 and Q4 are coupled in series between a VDD node and a ground node. The node 306 between Q3 and Q4 is coupled to a V-phase of the motor 302, where the V-phase includes a resistance (R) and inductance (L) corresponding to the stator components of the motor 302. Also, the current terminals of Q5 and Q6 are coupled in series between a VDD node and a ground node. The node 308 between Q5 and Q6 is coupled to a W-phase of the motor 302, where the W-phase includes a resistance (R) and inductance (L) corresponding to stator components of the motor.

With the arrangement represented in FIG. 3A, different phase current pulses are possible. More specifically, the different phase current pulses include $U\overline{V}$, $U\overline{W}$, $V\overline{W}$, $V\overline{U}$, $W\overline{U}$, and $W\overline{V}$, where each phase current pulse is obtained by driving different combinations of Q1-Q6 are represented in FIG. 3A. In the proposed examples, the timing parameters of one or more phase current pulses such as UV, UW, VW, VU, WU, and WV during an IPD interval is used to determine R and L values of a motor such as the motor 302.

Figure 3B:
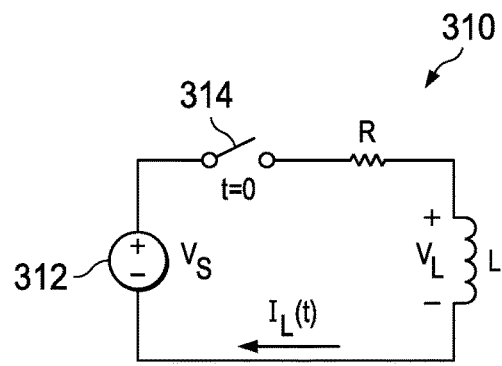
FIG. 3B is a diagram of a resistor-inductor (RL) circuit used to analyze load current ($i_L(t)$) in accordance with an example embodiments.

FIG. 3B is a diagram of a resistor-inductor (RL) circuit 310 used to analyze load current ($i_L(t)$) in accordance with some examples. As shown, the RL circuit 310 is represented as a voltage source 312, a switch 314, a resistor (R), and an inductor (L). When the switch 314 is closed at t=0, the current is $i_L(t)$ and the voltage across L is VL. In some example embodiments, $i_L(t)$ is determined by taking Kirchoff's Current Law, resulting in:

$$-V_S + i_L R + L\frac{di_L}{dt} = 0 \Rightarrow \frac{di_L}{dt} = -\frac{R}{L}\left(i_L - \frac{V_s}{R}\right) \Rightarrow \frac{di_L}{\left(i_L - \frac{V_S}{R}\right)} = -\frac{R}{L}dt \quad \text{Equation (1)}$$

$$\int_{i_L(0)}^{i_L(t)} \frac{di_L}{\left(i_L - \frac{V_S}{R}\right)} = -\int_0^t \frac{R}{L}dt \Rightarrow \ln\frac{i_L(t) - V_s/R}{i_L(0) - V_s/R} = -\frac{R}{L}t$$

For $i_L(0) = I_0$, $i_L(t) = \frac{V_s}{R} + \left(I_0 - \frac{V_s}{R}\right)e^{-\frac{R}{L}t}$ For $i_L(0) = 0$, $i_L(t) = \frac{V_s}{R}\left(1 - e^{-\frac{t}{\tau}}\right)$, where $\tau = L/R$ = time constant $I_1 = I_2 e^{-T2/\left(\frac{L}{R}\right)}$ and $$I_2 = \frac{V}{R} + (I_1 - V/R)e^{-T1/\left(\frac{L}{R}\right)}, \quad \text{Equation (2)}$$

where $I_1$ is a lower current limit, $I_2$ is an upper current limit, V is a 3-phase inverter supply voltage, R is the resistance value of the motor between U and V phase, T1 is the current rise time value, T2 is the current fall time value, and L is an inductance value of the motor between U and V phase. In some example embodiments, equations 1 and 2 are used to estimate R and L values, where the estimated R and L values are within a desired degree of accuracy because the values for T1 (e.g., obtained from the rise time logic 108 in FIG. 1, or the rise time logic 208 in FIG. 2) and T2 (e.g., obtained from the fall time logic 110 in FIG. 1, or the fall time logic 210 in FIG. 2) are sufficiently accurate.

Figure 4A:
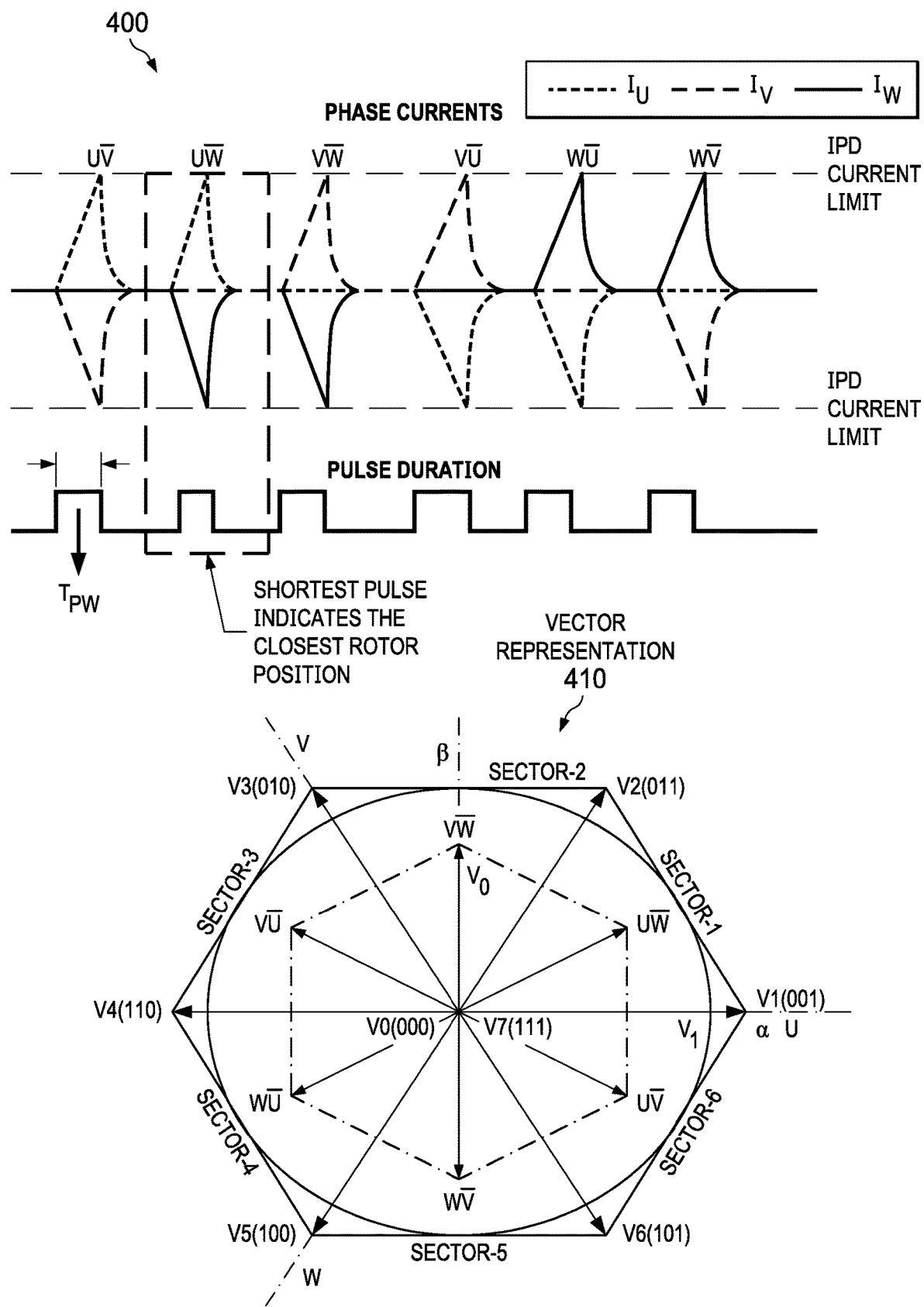
FIG. 4A is a diagram of phase currents and a vector representation of rotor position in accordance with an example embodiments.

FIG. 4A is a diagram 400 of phase currents and a vector representation of rotor position in accordance with an example embodiment. In the diagram 400, phase current pulses for $U\overline{V}$, $U\overline{W}$, $V\overline{W}$, $V\overline{U}$, $W\overline{U}$, and $W\overline{V}$ are represented along with pulse duration information. In the example of FIG. 4A, the shortest pulse corresponds to $U\overline{W}$, where the shortest pulse corresponds to the closest rotor position, where the rotor positions are described in the vector representation 410 of the diagram 400.

Figure 4B:
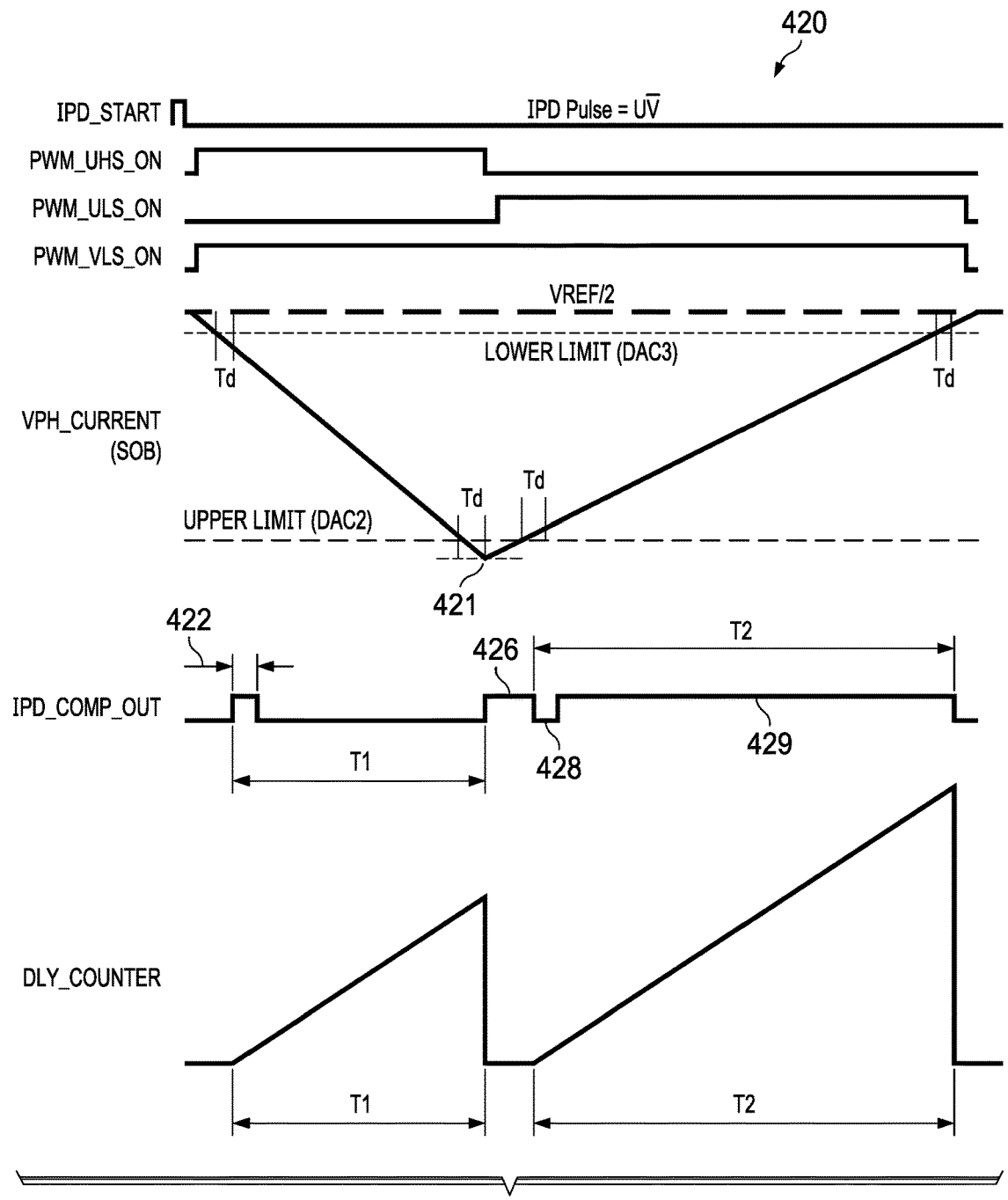
FIG. 4B is a timing diagram of waveforms related to obtaining a phase current rise time and fall time in accordance with an example embodiments.

FIG. 4B is a timing diagram 420 of waveforms related to obtaining phase current rise time and fall time values in accordance with an example embodiment. In the timing diagram 420 various waveforms are represented including an IPD start waveform, a PWM_UHS_ON waveform, a PWM_ULS_ON waveform, a PWM_VLS_ON waveform, a V-phase current ($I_V$) waveform, IPD_COMP_OUT waveform, and a DLY_COUNTER waveform. The IPD start waveform is an IPD start signal for a UV IPD pulse. The PWM_UHS_ON waveform is a U high side on signal that drives U-phase switches (e.g., Q1 on). The PWM_ULS_ON waveform is a U low side on signal that drives U-phase switches (e.g., Q2 on). The PWM_VLS_ON waveform is a V low side on signal that drives V-phase switches (e.g., Q4 on). The V-phase current waveform is a sense current value that indicates the V-phase current due injected a IPD pulse.

As shown, the V-phase current waveform ramps from a VREF/2 value (zero current, biased to mid value) past a lower limit and an upper limit until a point 401 beyond the upper limit. From the point 421, the VPH current waveform ramps past the upper limit and the lower limit to the VREF/2 value. In the example of FIG. 4B, the lower limit is offset from the VREF/2 value by some amount. Once the lower limit is reached by the VPH current and after a comparator delay (Td), comparator input threshold is changed to the upper limit. The comparator output remains high because of comparator delay for an interval 422 as represented by the IPD_COMP_OUT waveform. The duration from VPH current crossing the lower limit and a delay of the comparator (Td) to VPH current crossing the upper limit and a delay of the comparator (Td) is measured as T1 count. Once the upper limit is reached by the VPH current and after a comparator delay (Td), PWM_UHS_ON is made low. The VPH current start decaying and the comparator output remains high until current falls below the upper limit and after a comparator delay (Td) for an interval 426 as represented by the IPD_COMP_OUT waveform. Once the upper limit is reached by the VPH current in the other direction from point 421 and after a comparator delay (Td), the comparator input threshold is changed to the lower limit. The comparator output goes low for an interval 428 as represented by the IPD_COMP_OUT waveform. Once the interval 428 is complete, the comparator output goes high for an interval 429 until going low when the VPH current reaches the lower limit and after a comparator delay (Td) as represented by the IPD_COMP_OUT waveform.

Figure 4C:
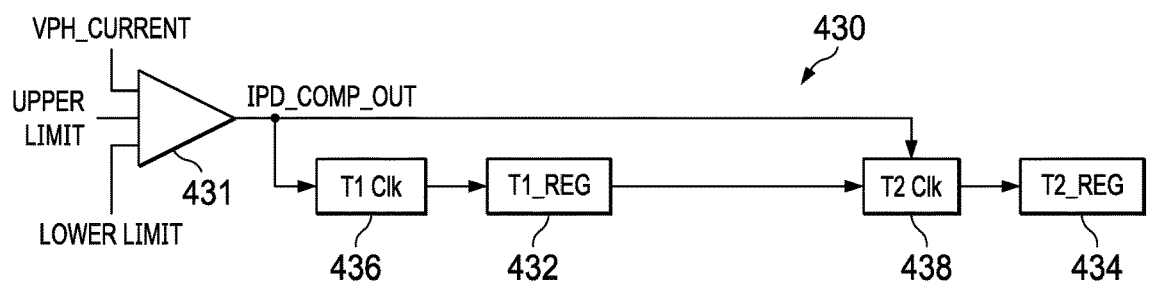
FIG. 4C is a block diagram showing timing logic to obtain current rise time and fall time values in accordance with an example embodiment.

In some example embodiments, a rise time value (T1) and a fall time value (T2) are tracked using VPH_CURRENT (from a current sense circuit), IPD_COMP_OUT (from a comparator with the lower limit and the upper limit), and related timing logic components. FIG. 4C is a block diagram showing timing logic 430 (an example of the rise time logic 108, 208 and fall time logic 110, 210 in FIGS. 1 and 2) to obtain current rise time and fall time values in accordance with an example embodiment. In the example of FIG. 4C, the timing logic 430 includes a comparator 431 configured to compare VPH_CURRENT with an upper limit and a lower limit, respective registers 432, 434, and clocks 436, 438 to store clock counts that represent T1 and T2. In the proposed example, use of the lower limit and the upper limit for the comparator operations accounts for comparator delay, resulting in more accurate rise time and fall time values.

In some example embodiments, the lower limit is selected based on the current sense circuit accuracy. Below the lower limit, the current sense amplifier output is presumed to not accurately represent the current flowing through that phase. Also, the upper limit is determined based on criteria, including: 1) the current comparator generates a wide enough pulse for timing measurement; 2) the upper limit produces low acoustic noise (e.g., less than a target level) during IPD; and 3) the upper limit does not cause the rotor to move during IPD.

With the timing logic 430, there is an improved accuracy of the rise and fall times, which helps ensure that R and L estimates based on the rise and fall times are accurate enough for use in rotor position estimation. In alternative embodiments, two separate comparators are used, where one comparator uses the lower limit and the other comparator uses the upper limit. Another option is to digitize the current sense measurements, and perform comparisons in the digital domain using the lower limit and the upper limit.

Figure 5A:
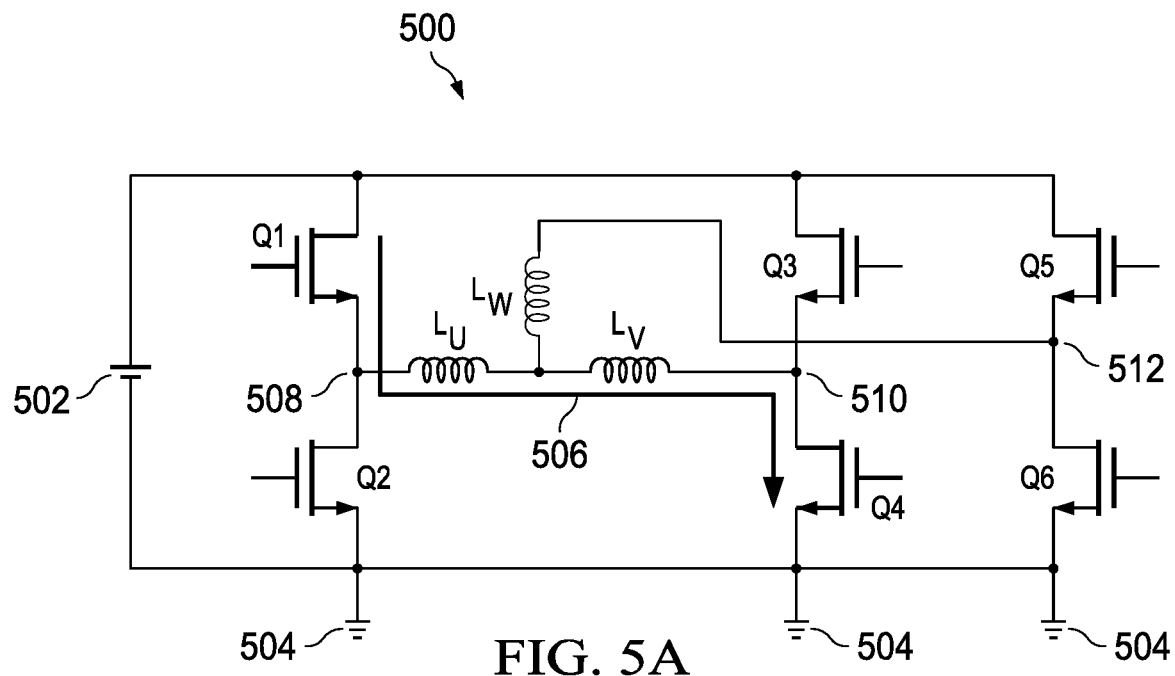
FIG. 5A is a diagram showing phase currents through a motor in accordance with the timing diagram of FIG. 4B.
Figure 5B:
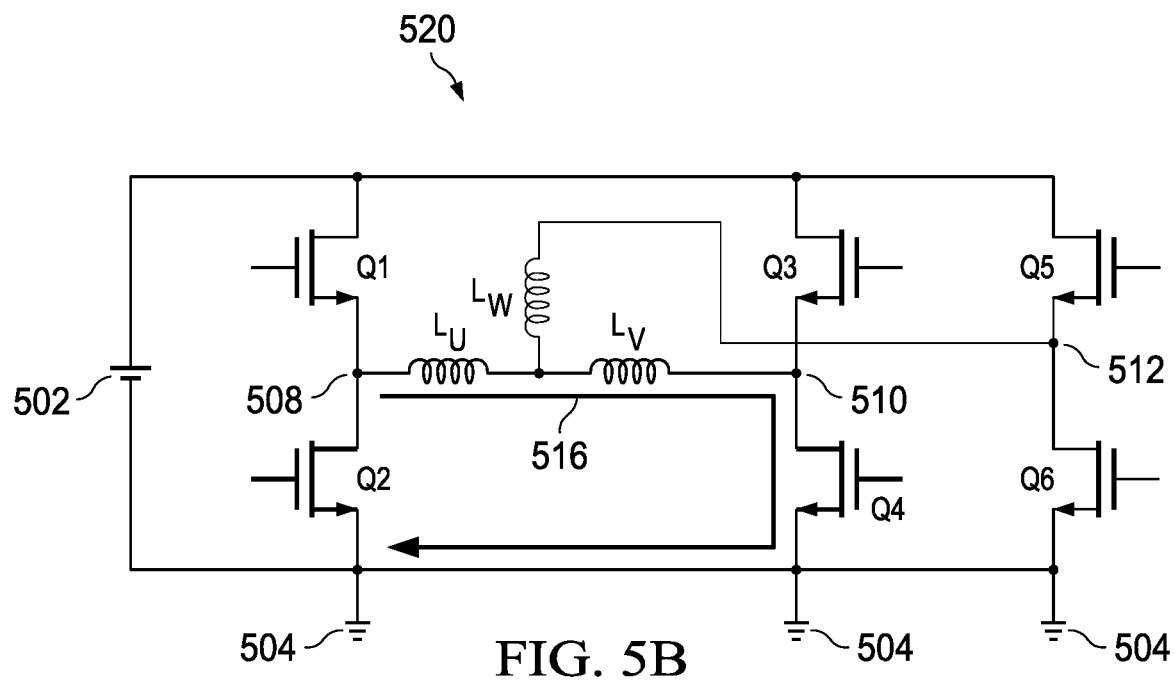
FIG. 5B is a diagram showing phase currents through a motor in accordance with an example embodiment.

FIGS. 5A and 5B are diagrams 500 and 510 showing phase currents through a motor in accordance with the timing diagram 420 of FIG. 4B. In the diagram 500, a motor (e.g., the motor 130 in FIGS. 1 and 2) is represented as inductors ($L_U$, $L_V$, $L_W$) and a 3-phase inverter (e.g., the 3-phase inverter 126 in FIGS. 1 and 2) is represented as switches Q1-Q6 in the arrangement shown. More specifically, the current terminals of Q1 and Q2 are coupled in series between a voltage supply 502 and a ground node 504. The node 508 between Q1 and Q2 is coupled to $L_U$ of the motor 302. Also, the current terminals of Q3 and Q4 are coupled in series between the voltage supply 502 and the ground node 504. The node 510 between Q3 and Q4 is coupled to $L_V$ of the motor 302. Also, the current terminals of Q5 and Q6 are coupled in series between the voltage supply 502 and the ground node 504. The node 512 between Q5 and Q6 is coupled to $L_W$. In the diagram 500 of FIG. 5A, Q1 and Q4 are on while Q2, Q3, Q5, and Q6 are off, resulting in a current 506 through the motor and measurement of T1 during an IPD interval as described herein (see e.g., FIG. 4B). In the diagram 510 of FIG. 5B, Q2 and Q4 are on while Q1, Q3, Q5, and Q6 are off, resulting in a current 516 through the motor and measurement of T2 during an IPD interval as described herein (see e.g., FIG. 4B).

Figure 6A:
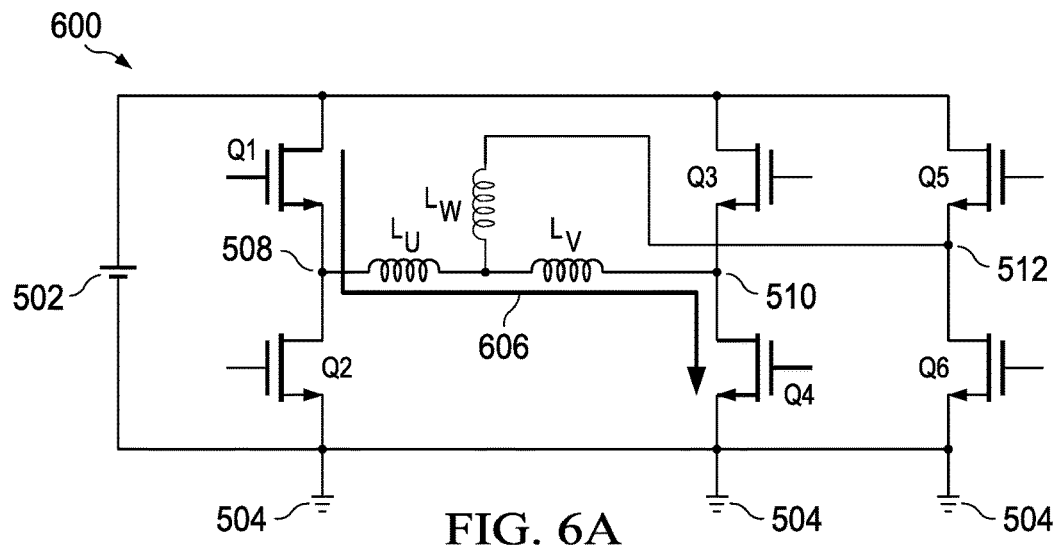
FIGS. 6A-6C are diagrams showing other phase currents through a motor in accordance with an example embodiment.
Figure 6B:
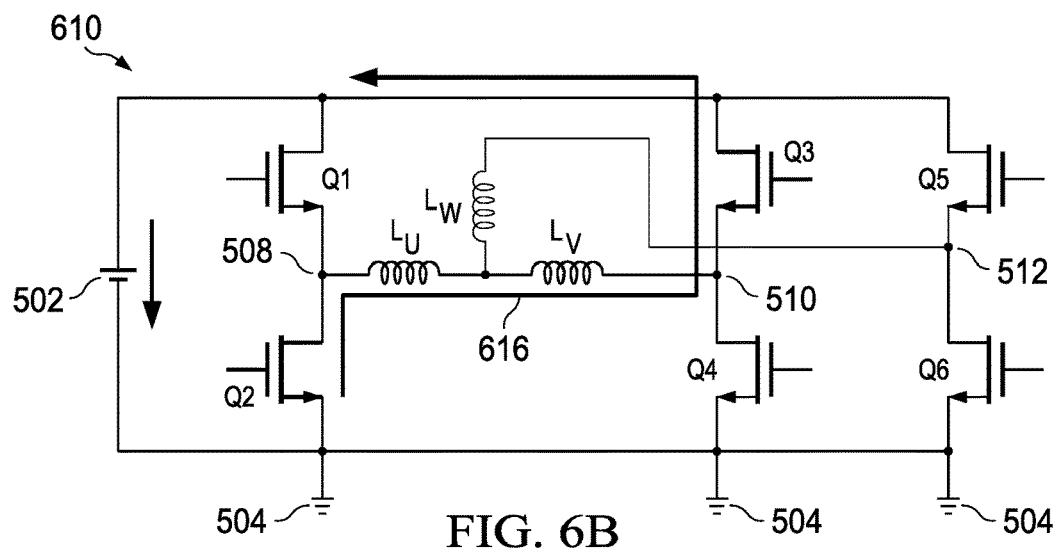
Figure 6C:
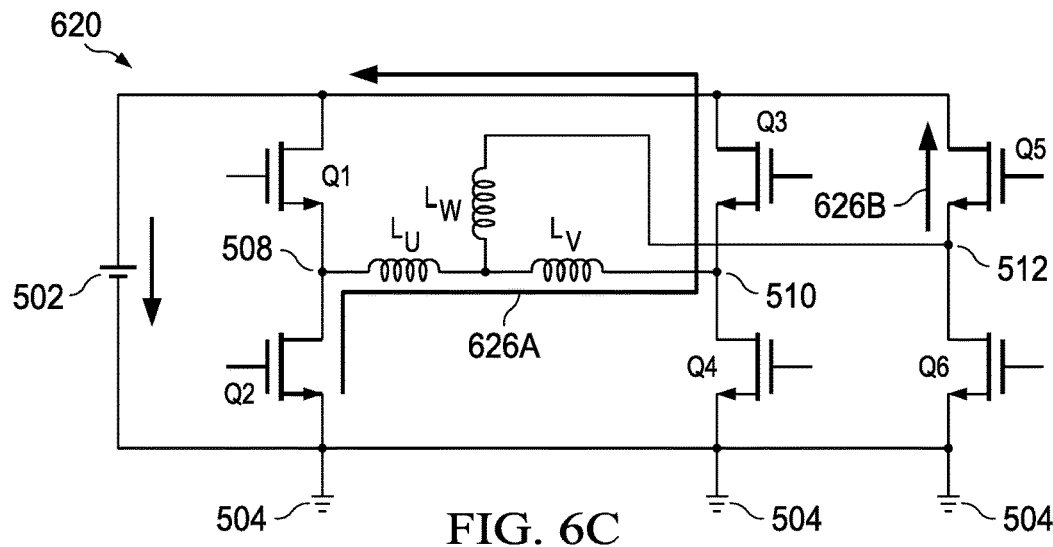

FIGS. 6A-6C are diagrams 600, 610, and 620 showing other phase currents through a motor in accordance with some examples. In the diagram 600 of FIG. 6A, the motor (e.g., the motor 130 in FIGS. 1 and 2) is represented as $L_U$, $L_V$, $L_W$ and a 3-phase inverter (e.g., the 3-phase inverter 126 in FIGS. 1 and 2) is represented as Q1-Q6 in the same arrangement shown in FIGS. 5A and 5B. In the diagram 600 of FIG. 6A, Q1 and Q4 are on while Q2, Q3, Q5, and Q6 are off, resulting in a current 606 through the motor. In the diagram 610 of FIG. 6B, Q2 and Q6 are on while Q1, Q4, Q5, and Q6 are off, resulting in a current 616 through the motor. In the diagram 620 of FIG. 6C, Q2, Q3, and Q5 are on while Q1, Q4, and Q6 are off, resulting in currents 626A and 626B through the motor. With the currents 606, 616, 626A, 626B represented in the diagrams 600, 610, and 620, the sense operations and calculations to estimate R and L of the motor would be updated to use the timing information for the available currents.

Figure 7:
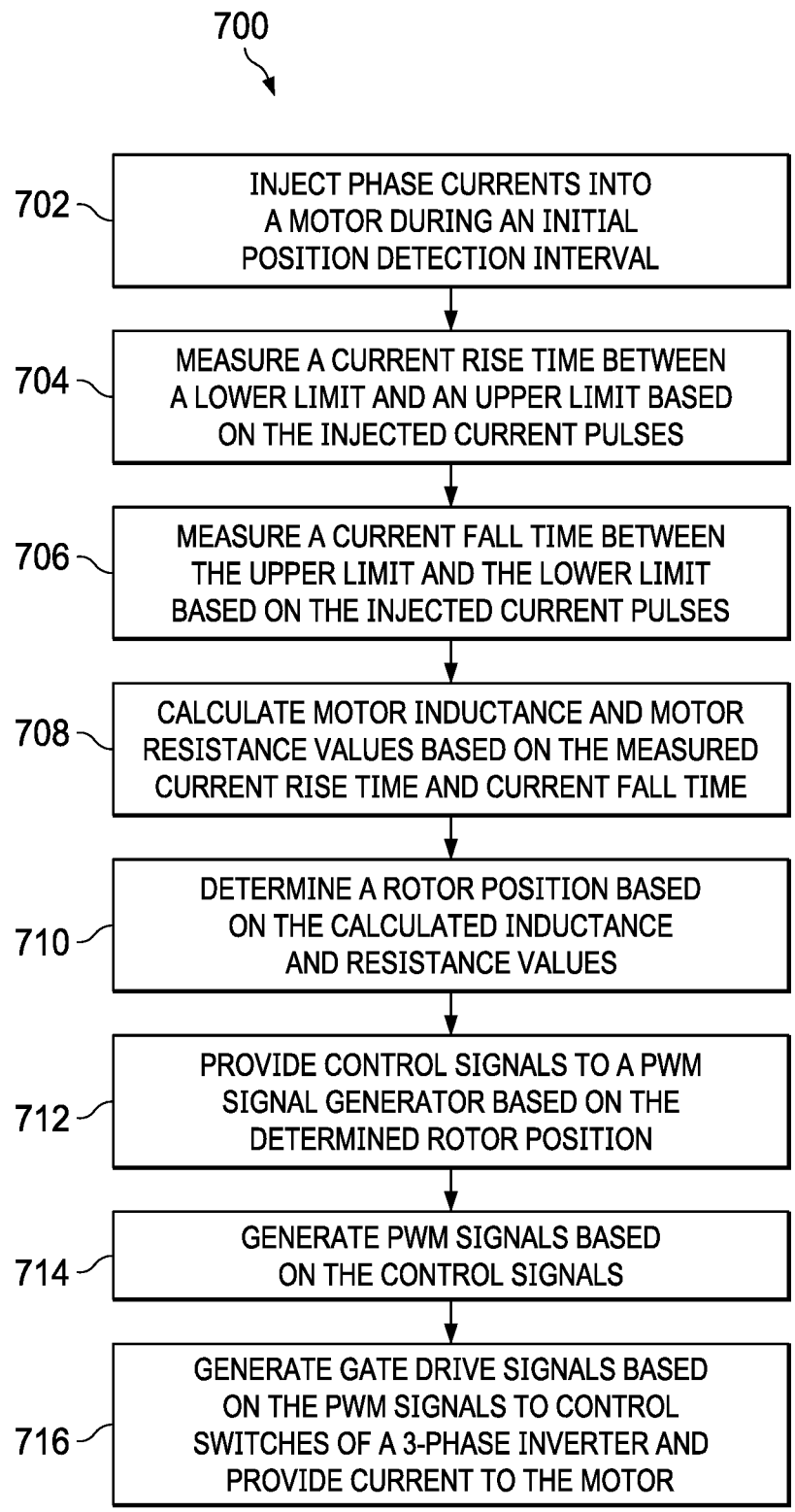
FIG. 7 is a flowchart showing a motor controller method in accordance with an example embodiment.

FIG. 7 is a flowchart showing a method 700 in accordance with some examples. As shown, the method 700 comprises injecting phase currents into a motor during an IPD interval at block 702. At block 704, a current rise time between a lower limit and an upper limit is measured based on the injected phase current pulses (e.g., using the sense circuit 104 in FIG. 1, or the sense circuit 204 in FIG. 2). At block 706, a current fall time between the upper limit and the lower limit is measured based on the injected phase current pulses (e.g., using the sense circuit 104 in FIG. 1, or the sense circuit 204 in FIG. 2). At block 708, motor R and L values are calculated (e.g., using the position analyzer 112 in FIG. 1, or the processor 214 or 220 in FIG. 2) based on the measured current rise time and current fall time (e.g., using equations 1 and 2, where T1 is the measured current rise time and T2 is the measured current fall time). At block 710, a rotor position is determined based on the estimated R and L values for the motor. At block 712, control signals (e.g., the components of the stator vector voltage in the ($\alpha$, $\beta$) stationary orthogonal reference frame) are provided to a PWM signal generator based on the determined rotor position. At block 714, PWM signals are generated based on the control signals. At block 716, gate drive signals are generated based on the PWM signals to control switches of a 3-phase inverter and provide current to the motor.

In some example embodiments, the control signals (e.g., the control signals 116) determined at block 712 are the components of the stator vector voltage in the ($\alpha$, $\beta$) stationary orthogonal reference frame. These control signals are the inputs to a PWM generator (e.g., a space-vector PWM generator). The PWM signals generated at block 714 are used to control both the frequency and magnitude of the voltage and current applied to a motor. As a result, PWM inverter-powered motor drivers offer better efficiency and higher performance compared to fixed frequency motor drivers. The energy that a PWM inverter (e.g., the 3-phase inverter 126) delivers to a motor is controlled by the PWM signals (e.g., the PWM signals 120) generated at block 714, which determine the timing of drive signals (e.g., the drive signals 124) to the gates of the power transistors of the PWM inverter. In different example embodiments, different PWM techniques (ways of determining the modulating signal and the switch-on/switch-off instants from the modulating signal) are possible. Available options includes sinusoidal PWM, hysteric PWM and the relatively new space-vector (SV) PWM.

A typical three-phase inverter controls six power transistors (Q1-Q6) to provide three output voltages (Va, Vb and Vc) based on drive signal a, a', b, b', c and c'. Specifically, a is the drive signal for high-side switch Q1, a' is the drive signal for low-side switch Q2, b is the drive signal for high-side switch Q3, b' is the drive signal for low-side switch Q4, c is the drive signal for high-side switch Q5, c' is the drive signal for low-side switch Q6. When an high-side transistor is switched on (i.e., when a, b or c is 1), the corresponding low-side transistor is switched off (i.e., the corresponding a', b' or c' is 0). The on and off states of the upper transistors, Q1, Q3 and Q5, or equivalently, the state of a, b and c, are sufficient to evaluate the output voltage for the purpose of this discussion.

With space-vector PWM, the relationship between the switching variable vector [a, b, c]t, the line-to-line output voltage vector [Vab Vbc Vca]$^t$, and the phase (line-to-neutral) output voltage vector [Va Vb Vc]$^t$ is given by equations 1 and 2 below.

$$\begin{bmatrix} V_{ab} \\ V_{bc} \\ V_{ca} \end{bmatrix} = V_{dc} \begin{bmatrix} 1 & -1 & 0 \\ 0 & 1 & -1 \\ -1 & 0 & 1 \end{bmatrix} \begin{bmatrix} a \\ b \\ c \end{bmatrix}, \quad \text{Equation (3)}$$

$$\begin{bmatrix} V_a \\ V_b \\ V_c \end{bmatrix} = \frac{1}{3} V_{dc} \begin{bmatrix} 1 & -1 & 0 \\ 0 & 1 & -1 \\ -1 & 0 & 1 \end{bmatrix} \begin{bmatrix} a \\ b \\ c \end{bmatrix}, \quad \text{Equation (4)}$$

where $V_{dc}$ is the DC supply voltage, or bus voltage. There are eight possible combinations of on and off states for the three high-side power transistors. In equations 3 and 4, the eight combination and the derived output line-to-line and phase voltages are expressed in terms of Vdc. Table 1 shows device on/off states and corresponding outputs (relative to $V_{dc}$) of a 3-phase inverter.

| a | b | c | $V_a$ | $V_b$ | $V_c$ | $V_{ab}$ | $V_{bc}$ | $V_{ca}$ |
|---|---|---|-------|-------|-------|----------|----------|----------|
| 0 | 0 | 0 | 0     | 0     | 0     | 0        | 0        | 0        |
| 1 | 0 | 0 | 2/3   | −1/3  | −1/3  | 1        | 0        | −1       |
| 1 | 1 | 0 | 1/3   | 1/3   | −2/3  | 0        | 1        | −1       |
| 0 | 1 | 0 | −1/3  | 2/3   | −1/3  | −1       | 1        | 0        |
| 0 | 1 | 1 | −2/3  | 1/3   | 1/3   | −1       | 0        | 1        |
| 0 | 0 | 1 | −1/3  | −1/3  | 2/3   | 0        | −1       | 1        |
| 1 | 0 | 1 | 1/3   | −2/3  | 1/3   | 1        | −1       | 0        |
| 1 | 1 | 1 | 0     | 0     | 0     | 0        | 0        | 0        |

In the proposed example embodiments, use of timing logic to obtain current rise time and current fall time values during an IPD interval enables accurate R and L value for a motor as described herein without external instrumentation to measure these values. These R and L values are used by a motor controller to estimate rotor position and provide control signals (e.g., the control signals 116) for a PWM generator based on the estimated rotor position. The control signals determine the timing of the drive signals a, a', b, b', c and c' for the power transistors of a 3-phase inverter, resulting in phase voltages ($V_a$, $V_b$, $V_c$) being applied to the motor and related phase currents ($I_A$, $I_B$, $I_C$) through the motor.

In some example embodiments, measuring each current rise time and current fall time in blocks 704 and 706 involves comparing a sensed phase current with an upper limit and a lower limit. In some example embodiments, measuring each current rise time and current fall time in blocks 704 and 706 involves storing a clock count based on results of said comparing. In some example embodiments, calculating the inductance and resistance values of the motor at block 708 involves a relationship between a first phase current value, a second phase current value, a current rise time value, a current fall time value, a resistance value of the motor, and an inductance value of the motor. In some example embodiments, the relationship is given as:

$$I_1 = I_2 e^{-T2/(\frac{L}{R})} \text{ and}$$

$$I_2 = \frac{V}{R} + (I_1 - V/R)e^{-T1/(\frac{L}{R})},$$

where $I_1$ is the lower current limit value, $I_2$ is the upper current limit value, V is supply voltage to the inverter, R is the resistance value of the motor, T1 is the current rise time value, T2 is the current fall time value, and L is an inductance value of the motor.

In some example embodiments, a system (e.g., the system 100 in FIG. 1, or the system 200 in FIGS. 2A and 2B) includes: a motor (e.g., the motor 130 in FIGS. 1 and 2B) having a stator and a rotor; and a pulse generation circuit (e.g., the pulse generator circuit 117 in FIGS. 1 and 2B) coupled to the stator. The system also includes a motor controller (e.g., the motor controller 102 in FIG. 1, or the processors 214 and 220 in FIGS. 2A and 2B) coupled to the pulse generation circuit. The motor controller is configured to determine inductance and resistance values (e.g., R and L herein) of the motor based on timing parameters (e.g., values 113 in FIG. 1, or T1 and T2 in FIG. 4B) obtained during an IPD interval. The motor controller is also configured to determine a rotor position (e.g., rotor position 115 in FIG. 1) based on the determined inductance and resistance values. The motor controller is also configured to generate control signals (e.g., control signals 116 in FIGS. 1 and 2B) for the pulse generation circuit based on the determined rotor position.

In some example embodiments, the motor controller comprises timing logic (e.g., the rise time logic 108 in FIG. 1, the fall time logic 110 in FIG. 1, the rise time logic 208 in FIG. 2B, the fall time logic 210 in FIG. 2B) configured to measure current rise times and fall times between a lower limit and an upper limit due to different phase currents injected during the IPD interval. In some example embodiments, the different phase currents include only two phase currents, and wherein the current rise time and the current fall time are used as the timing parameters to determine the inductance and resistance values of the motor. In some example embodiments, the different phase currents include three phase currents, and wherein the current rise time and the current fall time are used as the timing parameters to determine the inductance and resistance values of the motor.

In some example embodiments, the timing logic comprises a comparator (e.g., the comparator 431 in FIG. 4C) configured to receive a sense signal (e.g., VPH_CURRENT in FIG. 4B) and to compare the sense signal with the lower limit and the upper limit. In some example embodiments, the timing logic also includes a clock (e.g., the T1 clock 436 or the T2 clock 438 in FIG. 4C) coupled to an output of the comparator. In some example embodiments, the timing logic also includes registers (e.g., the T1 register 432 or the T2 register 434 in FIG. 4C) coupled to the clock and configured to store current rise time values (e.g., T1) and current fall time values (e.g., T2) based on the output of the comparator. The timing logic accounts for delay due to the comparator in the stored current rise time values and the stored current fall time values. In some example embodiments, the inductance and resistance values of the motor are determined based on a relationship between a lower current limit (e.g., $I_1$ in Equation 1), an upper current limit (e.g., $I_2$ in Equation 2), a current rise time value (e.g., T1), a current fall time value (e.g., T2), a resistance value (e.g., R in the values 114 in FIG. 1) of the motor, and an inductance value (e.g., L in the values 114 of FIG. 1) of the motor. In some example embodiments, the relationship is given as:

$$I_1 = I_2 e^{-T2/(\frac{L}{R})} \text{ and}$$

$$I_2 = \frac{V}{R} + (I_1 - V/R)e^{-T1/(\frac{L}{R})},$$

where $I_1$ is the lower current limit value, $I_2$ is the upper current limit value, V is the supply of the 3-phase inverter, R is the resistance value of the motor, T1 is the current rise time value, T2 is the current fall time value, and L is an inductance value of the motor.

With the proposed solution, accurate measurement of motor R and L values is achieved using timing parameters of phase current pulses injected during an IPD interval. No separate hardware is needed as the timing parameters are measured using existing IPD analysis components. More specifically, instead of just measuring phase current values during IPD analysis, a rise time value (T1) and a fall time value (T2) for at least one phase current pulse also measured. The T1 and T2 values are used to accurately estimate R and L values for a motor, which are then used (e.g., by a sensorless FOC algorithm) to determine a rotor position.

In some example embodiments, a motor controller device (e.g., the motor controller 102 in FIG. 1) includes a processor (the position analyzer 112 in FIG. 1, the processors 214, 220 in FIGS. 2A and 2B) and a sense circuit (e.g., the sense circuit 104 in FIG. 1, or the sense circuit 204 in FIG. 2B) coupled to the processor. The sense circuit includes a first phase current sense circuit (e.g., the first current sense circuit 205A in FIG. 2) and a second phase current sense circuit (e.g., the second current sense circuit 205B in FIG. 2). The sense circuit also includes a timing circuit (e.g., the rise time logic 208 and the fall time logic 210 in FIG. 2B) coupled to the first and second phase current sense circuits, wherein the timing circuit is configured to measure current rise times (e.g., T1 in FIG. 4B) and fall times (e.g., T2 in FIG. 4B) due to different phase currents sensed by the first and second phase current sense circuits during an IPD interval. The processor is configured to determine inductance and resistance values (e.g., the R and L values 114 in FIG. 1) of the motor based on the measured current rise times and fall times, and wherein the processor is configured to provide control signals (e.g., the control signals 116 in FIGS. 1 and 2B) based on the determined inductance and resistance values.

In some example embodiments, the processor uses a sensorless FOC algorithm to determine a rotor position based on the determined inductance and resistance values, and wherein the determined rotor position is used to generate the control signals. In some example embodiments, the different phase currents includes two phase currents (e.g., U and V phases) sensed by the first and second phase current sense circuits, and wherein the timing circuit comprises a comparator (e.g., the comparator 431 in FIG. 4C) configured to compare each sensed phase current with a lower limit and an upper limit (e.g., see the lower limit and the upper limit in FIG. 4B). The timing logic also includes a clock (e.g., the T1 clock 436 or the T2 clock 438) coupled to an output of the comparator. The timing logic also includes registers (e.g., the T1 register 432 or the T2 register 434 in FIG. 4C) coupled to the clock and configured to store current rise time values and current fall time values based on the output of the comparator. In some example embodiments, the timing logic accounts for delay due to the comparator in the stored current rise time values and the stored current fall time values.

In some example embodiments, the sense circuit further comprises a third phase current sense circuit (e.g., to sense $I_W$ represented in FIG. 1, where the timing circuit comprises a comparator (e.g., the comparator 431 in FIG. 4C) configured to compare each sensed phase current with a lower limit and an upper limit.

In some example embodiments, the processor is configured to determine the inductance and resistance values of the motor based on a relationship between a lower current limit (e.g., $I_1$ in Equation 1), an upper current limit (e.g., $I_2$ in Equation 2), a current rise time value (e.g., T1), a current fall time value (e.g., T2), a resistance value (e.g., R in the values 114 in FIG. 1) of the motor, and an inductance value (e.g., L in the values 114 of FIG. 1) of the motor. In some example embodiments, the relationship is given as:

$$I_1 = I_2 e^{-T2/(\frac{L}{R})} \text{ and}$$
$$I_2 = \frac{V}{R} + (I_1 - V/R)e^{-T1/(\frac{L}{R})},$$

where $I_1$ is the lower current limit value, $I_2$ is the upper current limit value, V is a 3-phase inverter supply voltage, R is the resistance value of the motor, T1 is the current rise time value, T2 is the current fall time value, and L is an inductance value of the motor.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The above discussion is meant to be illustrative of the principles and various embodiments of the present invention. Numerous variations and modifications will become apparent to those skilled in the art once the above disclosure is fully appreciated.

What is claimed is:

1. A system, comprising:
a pulse generation circuit configured to be coupled a motor; and
a motor controller coupled to the pulse generation circuit, wherein the motor controller is configured to:
determine inductance and resistance values of the motor based on timing parameters obtained during an initial position detection (IPD) interval;
determine a rotor position based on the determined inductance and resistance values; and
generate control signals for the pulse generation circuit based on the determined rotor position;
wherein the motor controller comprises timing logic configured to measure current rise times and fall times between a lower limit and an upper limit due to different phase currents injected during the IPD interval.

2. The system of claim 1, wherein the different phase currents comprise only two phase currents, and wherein the current rise time and the current fall time are used as the timing parameters to determine the inductance and resistance values of the motor.

3. The system of claim 1, wherein the different phase currents comprise three phase currents, and wherein the current rise time and the current fall time are used as the timing parameters to determine the inductance and resistance values of the motor.

4. The system of claim 1, wherein the timing logic comprises a comparator configured to receive a sense signal and to compare the sense signal with the lower limit and the upper limit.

5. The system of claim 4, wherein the timing logic further comprises:
at least one clock coupled to an output of the comparator; and
at least one register coupled to the at least one clock and configured to store current rise time values and current fall time values based on the output of the comparator.

6. The system of claim 4, wherein the timing logic accounts for delay due to the comparator in the stored current rise time values and the stored current fall time values.

7. The system of claim 1, wherein the inductance and resistance values of the motor are determined based on a relationship between a lower current limit value, an upper current limit value, a current rise time value, a current fall time value, a resistance value of the motor, and an inductance value of the motor.

8. The system of claim 7, wherein the relationship is given as:

$$I_1 = I_2 e^{-T2/(\frac{L}{R})} \text{ and}$$
$$I_2 = \frac{V}{R} + (I_1 - V/R)e^{-T1/(\frac{L}{R})},$$

where $I_1$ is the lower current limit value, $I_2$ is the upper current limit value, V is a 3-phase inverter supply voltage, R is the resistance value of the motor, T1 is the current rise time value, T2 is the current fall time value, and L is an inductance value of the motor.

9. A motor controller device, comprising:
a processor; and
a sense circuit coupled to the processor, wherein the sense circuit comprises:
a first phase current sense circuit;
a second phase current sense circuit;
a timing circuit coupled to the first and second phase current sense circuits, wherein the timing circuit is configured to measure current rise times and fall times due to different phase currents sensed by the first and second phase current sense circuits during an initial position detection (IPD) interval, wherein the processor is configured to determine inductance and resistance values of the motor based on the measured current rise times and fall times, and wherein the processor is configured to provide control signals for the motor based on the determined inductance and resistance values;
wherein the processor uses a field-oriented control (FOC) algorithm to determine a rotor position related to the motor based on the determined inductance and resistance values, and wherein the determined rotor position is used to generate the control signals.

10. A motor controller device, comprising:
a processor; and
a sense circuit coupled to the processor, wherein the sense circuit comprises:
   a first phase current sense circuit;
   a second phase current sense circuit;
   a timing circuit coupled to the first and second phase current sense circuits, wherein the timing circuit is configured to measure current rise times and fall times due to different phase currents sensed by the first and second phase current sense circuits during an initial position detection (IPD) interval,
wherein the processor is configured to determine inductance and resistance values of the motor based on the measured current rise times and fall times, and wherein the processor is configured to provide control signals for the motor based on the determined inductance and resistance values;
wherein the different phase currents comprise only two phase currents sensed by the first and second phase current sense circuits, and wherein the timing circuit comprises a comparator configured to compare each sensed phase current with a lower limit and an upper limit.

11. The motor controller device of claim 10, wherein the timing logic further comprises:
   at least one clock coupled to an output of the comparator; and
   at least one register coupled to the at least one clock and configured to store current rise time values and current fall time values based on the output of the comparator.

12. The motor controller device of claim 11, wherein the timing logic accounts for delay due to the comparator in the stored current rise time values and the stored current fall time values.

13. A motor controller device, comprising:
a processor; and
a sense circuit coupled to the processor, wherein the sense circuit comprises:
   a first phase current sense circuit;
   a second phase current sense circuit;
   a timing circuit coupled to the first and second phase current sense circuits, wherein the timing circuit is configured to measure current rise times and fall times due to different phase currents sensed by the first and second phase current sense circuits during an initial position detection (IPD) interval,
wherein the processor is configured to determine inductance and resistance values of the motor based on the measured current rise times and fall times, and wherein the processor is configured to provide control signals for the motor based on the determined inductance and resistance values;
wherein the sense circuit further comprises a third phase current sense circuit, wherein the different phase currents comprise three phase currents sensed by the first, second, and third phase current sense circuits, and wherein the timing circuit comprises a comparator configured to compare each sensed phase current with a lower limit and an upper limit.

14. A motor controller device, comprising:
a processor; and
a sense circuit coupled to the processor, wherein the sense circuit comprises:
   a first phase current sense circuit;
   a second phase current sense circuit;
   a timing circuit coupled to the first and second phase current sense circuits, wherein the timing circuit is configured to measure current rise times and fall times due to different phase currents sensed by the first and second phase current sense circuits during an initial position detection (IPD) interval,
wherein the processor is configured to determine inductance and resistance values of the motor based on the measured current rise times and fall times, and wherein the processor is configured to provide control signals for the motor based on the determined inductance and resistance values;
wherein the processor is configured to determine the inductance and resistance values of the motor based on a relationship between a lower current limit value, an upper current limit value, a current rise time, a current fall time, a resistance of the motor, and an inductance of the motor.

15. A motor control method, comprising:
injecting different phase current pulses into a motor during an initial position detection (IPD) interval;
measuring a current rise time and a current fall time for each of the different phase current pulses;
calculate inductance and resistance values of the motor based on the measured current rise times and current fall times;
determine a rotor position related to the motor based on the calculated inductance and resistance values of the motor; and
providing control signals to a pulse-width modulated (PWM) signal generator based on the calculated rotor position;
wherein measuring each current rise time and current fall time comprises comparing a sensed phase current with an upper limit and a lower limit.

16. The motor control method of claim 15, wherein measuring each current rise time and current fall time comprises storing a clock count based on results of said comparing.

17. The motor control method of claim 15, wherein estimating the inductance and resistance values of the motor involves a relationship between a lower current limit value, an upper current limit value, a current rise time value, a current fall time value, a resistance value of the motor, and an inductance value of the motor.

18. The motor control method of claim 16, wherein the relationship is given as:

$$I_1 = I_2 e^{-T2/(\frac{L}{R})} \text{ and}$$
$$I_2 = \frac{V}{R} + (I_1 - V/R)e^{-T1/(\frac{L}{R})},$$

where $I_1$ is the lower current limit value, $I_2$ is the upper current limit value, V is a 3-phase inverter supply voltage, R is the resistance value of the motor, T1 is the current rise time value, T2 is the current fall time value, and L is an inductance value of the motor.

* * * * *